(12) United States Patent
Rothmund et al.

(10) Patent No.: US 12,552,383 B2
(45) Date of Patent: Feb. 17, 2026

(54) METHOD FOR STOPPING UNDESIRED CONTINUATION IN A CURRENT DIRECTION OF TRAVEL

(71) Applicant: ZF FRIEDRICHSHAFEN AG, Friedrichshafen (DE)

(72) Inventors: Andreas Rothmund, Hohentengen (DE); Matthias Madlener, Hohentengen (DE); Guilherme Ariello, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 173 days.

(21) Appl. No.: 18/494,785

(22) Filed: Oct. 26, 2023

(65) Prior Publication Data

US 2024/0140427 A1    May 2, 2024

(30) Foreign Application Priority Data

Oct. 28, 2022  (DE) .......................... 102022211488.4

(51) Int. Cl.
  *B60W 30/18* (2012.01)
  *B60L 3/12* (2006.01)

(52) U.S. Cl.
  CPC ......... *B60W 30/18036* (2013.01); *B60L 3/12* (2013.01); *B60L 2240/421* (2013.01); *B60W 2510/081* (2013.01); *B60W 2520/06* (2013.01)

(58) Field of Classification Search
  CPC ..... B60W 30/18036; B60W 2510/081; B60W 2520/06; B60W 10/08; B60W 30/18; B60W 40/00; B60W 40/08; B60L 3/12; B60L 2240/421; B60L 2200/40; B60L 2240/32; B60L 2240/80; B60L 15/20; H02P 23/24; H02P 23/14
  See application file for complete search history.

(56) References Cited

U.S. PATENT DOCUMENTS

| | | | |
|---|---|---|---|
| 5,568,024 A | 10/1996 | Suzuki | |
| 2004/0024513 A1* | 2/2004 | Aizawa | B60T 8/4872 701/70 |
| 2007/0013498 A1 | 1/2007 | Knoll et al. | |

(Continued)

FOREIGN PATENT DOCUMENTS

| | | |
|---|---|---|
| DE | 19517567 A1 | 11/1995 |
| DE | 10339647 A1 | 3/2005 |
| DE | 102011089093 B4 | 8/2021 |

*Primary Examiner* — Sze-Hon Kong
(74) *Attorney, Agent, or Firm* — LEYDIG, VOIT & MAYER, LTD.

(57) ABSTRACT

A method for stopping undesired continuation in a current direction of travel of a work machine, wherein the work machine has an electrical machine for propulsion of the work machine, the method including detecting a desired direction of travel of a driver of the work machine. The method further includes detecting a state variable of the work machine that correlates with an actual direction of travel of the work machine determining, on the basis of the detected desired direction of travel and the detected state variable, whether the electrical machine is in a safety-critical state, and, if it has been determined that the electrical machine is in the safety-critical state, sending a signal to the electrical machine to convert the electrical machine into a state not suitable for propulsion.

9 Claims, 2 Drawing Sheets

(56) References Cited

U.S. PATENT DOCUMENTS

| | | | | |
|---|---|---|---|---|
| 2013/0178332 A1* | 7/2013 | Kazama | ................. | B60L 50/51 |
| | | | | 477/21 |
| 2014/0350799 A1* | 11/2014 | Kikuyama | ................ | B60L 7/14 |
| | | | | 701/50 |
| 2018/0065629 A1* | 3/2018 | Wolff | .............. | B60W 30/18009 |
| 2021/0276562 A1* | 9/2021 | Suzuki | ................ | B60W 10/119 |

* cited by examiner

METHOD FOR STOPPING UNDESIRED CONTINUATION IN A CURRENT DIRECTION OF TRAVEL

CROSS REFERENCE TO RELATED APPLICATIONS

This application claims benefit to German Patent Application No. DE 10 2022 211 488.4, filed on Oct. 28, 2022, which is hereby incorporated by reference herein.

FIELD

The present invention relates to a method for stopping undesired continuation in a current direction of travel of a work machine. The present invention also relates to a controller designed to carry out such a method. The present invention further relates to a drive group having such a controller and to a work machine having such a drive group.

BACKGROUND

Methods for controlling driving behaviors of vehicles are known from the prior art, Driving behaviors can be actively induced, for example via active braking. Alternatively, driving behaviors can be prevented, for example via a lane change.

SUMMARY

In an embodiment, the present disclosure provides a method for stopping undesired continuation in a current direction of travel of a work machine, wherein the work machine has an electrical machine for propulsion of the work machine, the method comprising detecting a desired direction of travel of a driver of the work machine. The method further comprises detecting a state variable of the work machine that correlates with an actual direction of travel of the work machine determining, on the basis of the detected desired direction of travel and the detected state variable, whether the electrical machine is in a safety-critical state, and, if it has been determined that the electrical machine is in the safety-critical state, sending a signal to the electrical machine to convert the electrical machine into a state not suitable for propulsion.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
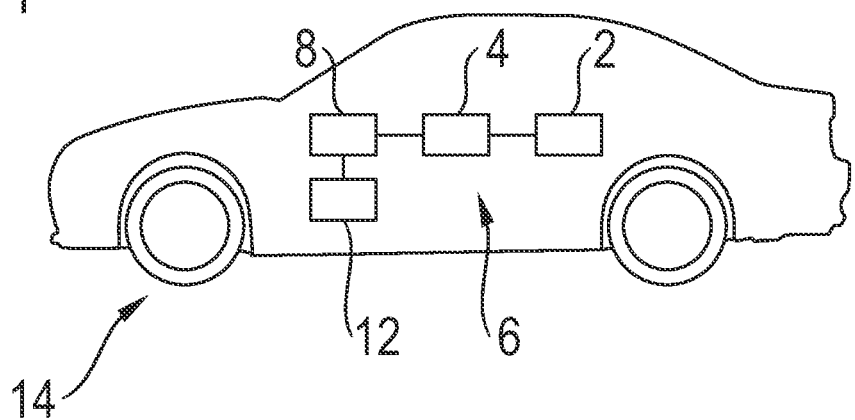
FIG. 1 shows a schematic view of a work machine having a drive group and a controller according to an embodiment.

In a first aspect, the present invention relates to a method for stopping undesired continuation in a current direction of travel of a work machine. The work machine can be an agricultural machine, a construction machine, a transport machine or an off-highway vehicle. The work machine has an electrical machine for propulsion of the work machine. The electrical machine can be supplied with electrical energy from an energy store, for example a battery such as a lithium-ion battery, in order to propel the work machine. In addition to the electrical machine for propulsion, the work machine can have further machines such as further electrical machines, for example for raising a mast. The work machine can also have a controller, which can be designed to carry out the method for stopping undesired continuation in a current direction of travel of the work machine. The electrical machine can have an inverter, for example a low-voltage inverter. The undesired continuation in a current direction of travel can be a continuation in a current direction of travel against the will of a driver of the work machine. Stopping the undesired continuation in the current direction of travel can comprise preventing further continuation in the current direction of travel.

The method comprises detecting a desired direction of travel from the driver of the work machine. In the process, information relating to a position of a direction of travel switch can be detected and sent to the controller carrying out the method. Detecting the desired direction of travel can comprise receiving information relating to the position of the direction of travel switch. Detecting the desired direction of travel can comprise determining the desired direction of travel depending on the received information relating to the position of the direction of travel switch. The desired direction of travel can be, for example, forward, backward or neutral. Information relating to the position of the direction of travel switch can be detected via a bus system such as CAN or FlexRay.

The method further comprises detecting a state variable of the work machine that correlates with an actual direction of travel of the work machine. A state variable correlating with the actual direction of travel of the work machine can be, for example, a rotational speed of a wheel or a track of the work machine. The rotational speed can be negative, zero or positive. Depending on the sign of the rotational speed, the actual direction of travel of the work machine can be, for example, forward, backward or neutral, wherein neutral can mean that the work machine is not moving and is at a standstill. Detecting the state variable can comprise receiving information relating to the state variable.

The method further comprises determining, on the basis of the detected desired direction of travel and the detected state variable, whether the electrical machine is in a safety-critical state. For example, the electrical machine is in a safety-critical state when the desired direction of travel and the actual direction of travel correlating with the state variable are different. For example, the driver may wish to drive forward, and the state variable may indicate, for example, that the actual direction of travel is backward.

If it has been determined that the electrical machine is in a safety-critical state, the method also comprises sending a signal to the electrical machine to convert the electrical machine into a state not suitable for propulsion. The controller for carrying out the method can be connected electronically to the electrical machine and to the inverter. The inverter and alternatively or additionally the electrical machine can thus be sent the signal to convert the electrical machine into the state not suitable for propulsion. In the process, a safety state query can be sent from the controller carrying out the method to the electrical machine or the inverter. The state not suitable for propulsion can be a safe state of the electrical machine. In the state not suitable for propulsion, it can be provided for the electrical machine to be unable to apply any drive force for the propulsion of the work machine.

The disclosed method can thus be used to safeguard against and stop continuation in the current direction of travel. For example, in a situation in which there is a hardware fault or software error in the controller, and this triggers undesired continuation in the current direction of travel, such a method can be used to stop the undesired continuation in the current direction of travel by means of the control unit and by carrying out the method.

According to an embodiment, the method can be characterized in that detecting the state variable correlating with the actual direction of travel comprises detecting a motor rotation direction of the electrical machine. This can be detected via sensors on the electrical machine, for example. Alternatively or additionally, the motor rotation direction can be detected via current and voltage measurements at the inverter and alternatively or additionally at the electrical machine. The detected motor rotation direction can be sent from the inverter or from the electrical machine to the controller carrying out the method, and detecting the state variable can comprise receiving information in the form of a signal. The method can also be characterized in that detecting the state variable comprises determining the actual direction of travel on the basis of the detected motor rotation direction. The actual direction of travel can be determined depending on the motor rotation direction via a predetermined gear ratio. For example, when a motor rotation direction is in a first direction, the actual direction of travel can be forward. When a motor rotation direction is in a second direction opposite the first direction, the actual direction of travel can be backward. If the motor rotation direction is zero, the actual direction of travel can be neutral, and the work machine can be at a standstill. The method can also be characterized in that a safety-critical state is determined when the determined actual direction of travel is different from the detected desired direction of travel. For example, the actual direction of travel can be directed in a first direction of travel, for example forward, and the desired direction of travel can be directed in a second direction of travel opposite the first direction of travel, for example backward. Alternatively, the desired direction of travel can be neutral and different from the actual direction of travel, for example forward or backward.

As a result, a method is disclosed that can determine an actual direction of travel by means of information relating to the motor rotation direction and can determine the safety-critical state by means of this determined actual direction of travel. It is thus possible to send the signal to the electrical machine to convert the electrical machine into a state not suitable for propulsion on the basis of a state variable of the electrical machine that is simple to measure, that is, the motor rotation direction. The fact that the determined actual direction of travel is different from the detected desired direction of travel can be a prerequisite for embodiments described below. Because the determined actual direction of travel is different from the detected desired direction of travel, the continuation in the current direction of travel of the work machine can be an undesired continuation.

According to an embodiment, the method can be characterized in that detecting the state variable correlating with the actual direction of travel comprises detecting a motor speed of the electrical machine. Detecting the motor speed of the electrical machine can comprise receiving a signal comprising information relating to the motor speed of the electrical machine from the inverter and alternatively or additionally from the electrical machine. The motor speed can be detected by means of sensors on the electrical machine. Alternatively or additionally, the motor speed can be ascertained via current and voltage measurements. Detecting the motor speed can also comprise detecting the motor rotation direction. The actual direction of travel can thus be determined on the basis of the detected motor speed. The method can also be characterized in that a safety-critical state is determined when the detected motor speed is outside a parameter range around a motor speed corresponding to a standstill of the work machine. The motor speed corresponding to a standstill of the work machine can be zero, for example. The parameter range can comprise both positive and negative motor speeds, with the parameter range being arranged symmetrically around a motor speed of zero, for example.

With the method disclosed, a safety-critical state can be determined when the motor speed is outside a range around a motor speed corresponding to the standstill of the work machine. A functionality of the method for stopping undesired continuation in the current direction of travel can thus be provided at travel speeds corresponding to motor speeds outside the parameter range. It is thus possible for the method to be carried out only at travel speeds greater than a minimum speed. It is thus possible for undesired continuation in a current direction of travel to be stopped only to a minimum speed but not at lower speeds.

According to an embodiment, the method can be characterized in that a gradient of the motor speed can be determined on the basis of the detected motor speed. In this case, the controller can be designed to determine the gradient of the motor speed. The method can also be characterized in that a safety-critical state is determined when the determined gradient of the motor speed is smaller than a minimum gradient. To this end, the determined gradient can be compared with the minimum gradient. The minimum gradient can be a predetermined minimum gradient and be stored on the controller. The minimum gradient can be parameterizable during coding of the controller. The determination of the gradient and the determination of the safety-critical state depending on the determined gradient can also be independent of the parameter range and the detected motor speed.

By determining a gradient of the motor speed and comparing it with the minimum gradient, a change in an actual movement of the work machine can be established. It can thus be established whether the work machine is still advancing and thus there is possibly an undesired continuation in the current direction of travel. The safety-critical state can thus be determined when the gradient of the motor speed is smaller than a minimum gradient, for example when the motor speed does not change significantly over time, since the work machine continues in the current direction of travel or at least does not decelerate significantly. If the motor speed decreases but not sufficiently, that is, for example, when the gradient is smaller than the minimum gradient, the method can also stop undesired continuation in the current direction of travel in this case by determining the safety-critical state.

According to an embodiment, the method can be characterized in that information relating to an operating mode of the electrical machine is detected. In this case, the detection can comprise receiving information relating to the operating mode from the inverter and alternatively or additionally from the electrical machine. The operating mode can comprise information relating to a torque provided by the electrical machine for the propulsion of the work machine.

For example, the operating mode can be one of a generator operation, a motor operation and a torque-free operation. During generator operation, the electrical machine can be operated as a generator, and there can be a negative torque, wherein torque is transmitted to the electrical machine via the powertrain, for example. During motor operation, there can be a positive torque, and the electrical machine can be designed to provide torque for the propulsion of the work machine during motor operation. During torque-free operation, the torque transmitted from or to the electrical machine can be lower than one or more threshold torques. The method can also be characterized in that a safety-critical state is determined when the electrical machine is in motor operation. The safety-critical state thus cannot be determined when the electrical machine is in generator operation or in torque-free operation, for example. Accordingly, the safety-critical state can be determined when torque is actively transmitted from the electrical machine for the propulsion of the work machine. The safety-critical state can be determined when the electrical machine remains in motor operation, i.e., is in motor operation for a certain period of time.

The method can thus take an operating mode of the electrical machine into account. In this case, it can be taken into account whether the work machine is being actively driven or is merely coasting. During coasting, there can be a torque-free state of the electrical machine, for example, and the safety-critical state cannot be determined in such a case, for example. As a result, the robustness of the method to unnecessary shutdowns can be improved, for example. Furthermore, a low-voltage inverter can be used in combination with a controller that can carry out the method. With such low-voltage inverters, it is sometimes the case that exact information relating to current or past torques at the electrical machine is not available. It is possible that only information relating to whether the torque is above or below certain threshold torques is available. For example, this information can be sent in the form of the operating mode to the controller for carrying out the method. In connection with some embodiments, the safety-critical state can be determined either when the gradient is smaller than a minimum gradient or when the electrical machine is in motor operation. A safety-critical state can be determined even if only one of these two conditions is met. The safety-critical state can also be determined if both conditions are met.

According to an embodiment, the method can be characterized in that a safety-critical state is determined when the safety-critical state is present for the duration of an error tolerance time. The error tolerance time can be, for example, several milliseconds, several hundredths or tenths of a second, or a few seconds. The error tolerance time can be parameterizable and alternatively or additionally codable on the controller that can carry out the method. For example, a safety-critical state can be determined when the operating mode of the electrical machine is in motor operation for the duration of the error tolerance time and the desired direction of travel and the actual direction of travel are different. This can include a situation in which the actual direction of travel is forward and the desired direction of travel is neutral or backward. In addition, it can include a situation in which the actual direction of travel is backward and the desired direction of travel is neutral or forward. Alternatively, the motor speed can be monitored for motor operation. Independently of the operating mode, the safety-critical state can be determined when the gradient of the motor speed is smaller than the minimum gradient for the duration of the error tolerance time. In at least some or all of the aforementioned cases, the error tolerance time can start as soon as the actual direction of travel and the desired direction of travel are different.

The provision of the error tolerance time means that the method can be made more robust to undesired unnecessary shutdowns. Thus, the safety-critical state cannot be determined when the conditions for determining the safety-critical state are present for shorter than the duration of the error tolerance time. If a desired direction of travel different is from the actual direction of travel only for a short time that is shorter than the error tolerance time, for example, the determination of the safety-critical state can be avoided. This can also happen when the operating mode remains in motor operation and the gradient of the motor speed is smaller than the minimum gradient. No signal is then sent to the electrical machine to convert the electrical machine into a state not suitable for propulsion. For example, this can occur when there is a brief signal error at the direction of travel switch to the controller carrying out the method.

According to an embodiment, the method can be characterized in that a reversing request is determined on the basis of the detected desired direction of travel and the detected state variable. For example, a reversing request can be determined when the desired direction of travel changes from forward to backward and the actual direction of travel remains forward. Alternatively, a reversing request can be determined when the desired direction of travel changes from backward to forward and the actual direction of travel remains backward. For example, no reversing request can be determined when the desired direction of travel changes from either forward or backward to neutral. Furthermore, if it has been determined that there is a reversing request, a safety-critical state can be determined when the safety-critical state is present for a debouncing time. If there is no reversing request, the safety-critical state can be determined even if the safety-critical state is present for shorter than the debouncing time. The debouncing time and the error tolerance time can be summed. Thus, when there is a reversing request, the safety-critical state can be determined when the safety-critical state is present for at least the duration of the error tolerance time and additionally the duration of the debouncing time. If there is no reversing request, the safety-critical state can be determined when the safety-critical state is present for at least the duration of the error tolerance time.

In the case of a reversing request, the method can thus take account of an inertia of the work machine. An additional time, the debouncing time, can be necessary for a reversing request. The provision of this debouncing time in the case of a reversing request means that the method can be made more robust by giving the method an additional time, the debouncing time, to determine the safety-critical state in the case of a reversing request in comparison with the case when there is no reversing request. In contrast to this, it can be provided for the method to determine that a safety-critical state is present faster when there is no reversing request.

A second aspect of the invention relates to a controller designed to carry out a method for controlling a work machine according to an embodiment of the first aspect of the invention. Controlling the work machine can comprise stopping undesired continuation in a current direction of travel of the work machine. The controller can comprise interfaces for receiving and sending signals from and to sensors, actuators and further controllers. The controller can be designed to determine a driving strategy for the work machine depending on a drive command, which can comprise the desired direction of travel and alternatively or additionally a driving request, and to actuate the electrical machine with a setpoint torque.

A third aspect of the invention relates to a drive group having an electrical machine and a controller according to the second aspect of the present invention. The electrical machine can have a low-voltage inverter. A current torque at the electrical machine can be determined by the low-voltage inverter only to a limited extent, and information relating to the torque at the electrical machine can be sent from the low-voltage inverter to the controller in the form of information relating to the operating mode. Furthermore, information relating to the motor speed at the electrical machine can be sent from the low-voltage inverter to the controller. The low-voltage inverter can be designed to convert the electrical machine into a torque-free state after the signal is sent to convert the electrical machine into a state not suitable for propulsion.

A fourth aspect of the present invention relates to a work machine having a vehicle controller, a direction of travel switch, and a drive group according to the third aspect of the present invention. Alternatively, the work machine has at least one pedal, for example a brake pedal and a gas pedal. The at least one pedal and alternatively or additionally the direction of travel switch can be connected electrically and electronically to the vehicle controller, which in turn can be connected electrically and electronically to the drive group and in the process to the controller of the drive group. Signals from the at least one pedal and alternatively or additionally from the direction of travel switch can be sent to the controller via the vehicle controller. In the controller, steps of the method for stopping undesired continuation in the current direction of travel of the work machine can be carried out. Furthermore, the work machine can be designed to convert the electrical machine into a state not suitable for propulsion. The work machine can be designed according to the above disclosure.

DETAILED DESCRIPTION OF EMBODIMENTS

Figure 2:
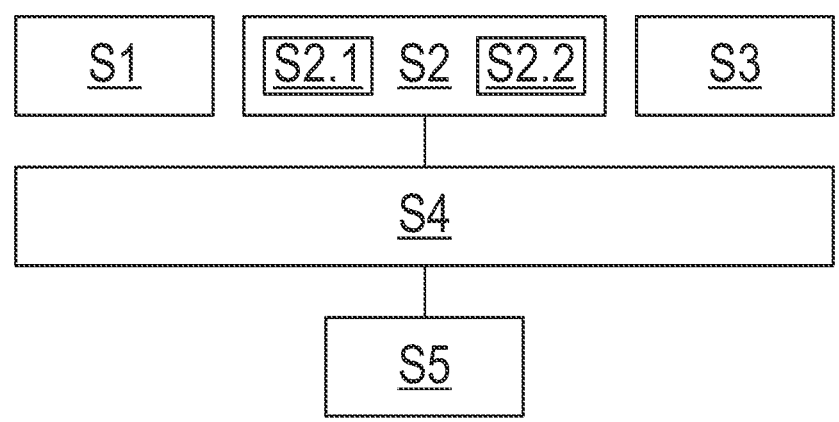
FIG. 2 schematically shows steps of a method for stopping undesired continuation in a current direction of travel of a work machine according to FIG. 1.

FIG. 1 schematically shows a work machine 14 according to an embodiment of the present invention. The work machine 14 has a drive group 6 of an embodiment of the present invention. The drive group 6 has a controller 4 of an embodiment of the present invention and an electrical machine 2. The drive group 6 also has a low-voltage inverter. The electrical machine 2 is connected electrically and electronically to the controller 4 via the low-voltage inverter. The work machine 14 also has a vehicle controller 8, which is electrically and electronically connected to the controller 4. The vehicle controller 8 is electrically and electronically connected to a direction of travel switch 12 and a pedal. The vehicle controller 8 is designed to receive signals from the direction of travel switch 12 and from the pedal, process them and send them to the controller 4. The electrical machine 2 and the low-voltage inverter are designed to send electrical signals to the controller 4. This sending takes place via a CAN bus system. The controller 4 is designed to carry out a method for stopping undesired continuation in the current direction of travel of the work machine 14 according to the steps shown schematically in FIG. 2.

FIGS. 3a to 3d each show, by way of example, changes over time in state variables while the method for stopping undesired continuation in the current direction of travel of the work machine 14 is carried out. The state variables desired direction of travel FRW, motor speed n and operating mode BM are shown over time t.

At a time point t1, the desired direction of travel FRW changes. The desired direction of travel FRW changes in FIG. 3a from forward to backward, in FIG. 3b from backward to forward, in FIG. 3c from forward to neutral, and in FIG. 3d from backward to neutral. The cases shown in FIGS. 3a to 3d thus show the four different possible ways in which the method can be used to stop undesired continuation in a current direction of travel of the work machine 14. The change in the desired direction of travel FRW is made in that a driver of the work machine 14 changes a position of a direction of travel switch 12, for example from a first position to a second position. The desired direction of travel FRW of the driver of the work machine 14 is detected S1. A signal comprising information relating to the desired direction of travel FRW is sent from the vehicle controller 8 to the controller 4.

Figure 3A:
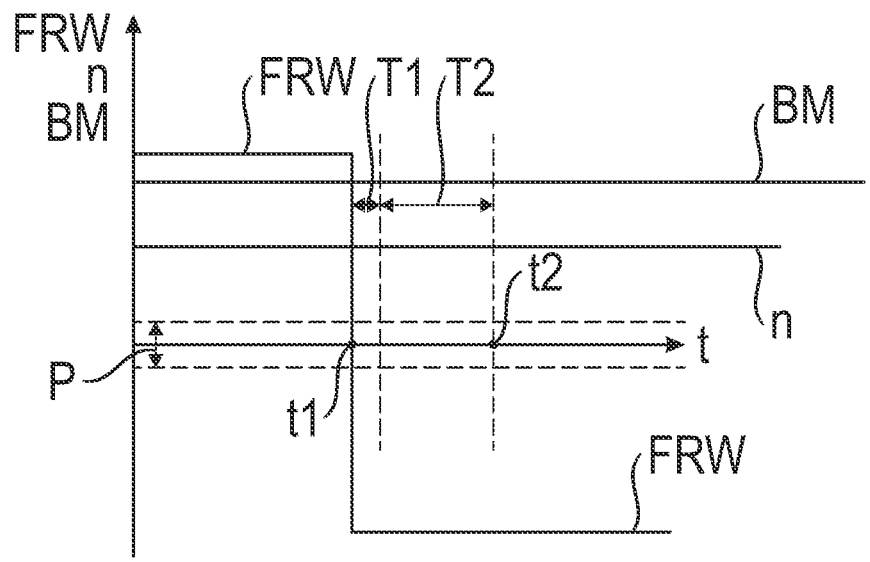
FIG. 3a, FIG. 3b, FIG. 3c and FIG. 3d each schematically show the progression of state variables over time while the method is carried out with the steps shown schematically in FIG. 2.
Figure 3B:
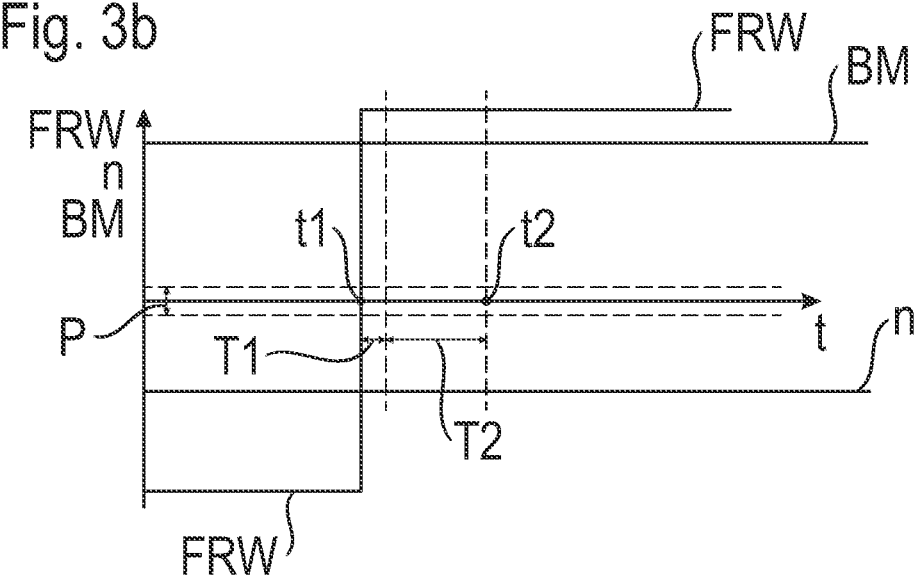

A state variable of the work machine 14 is also detected S2. In this case, the motor speed n is detected S2. In the process, a signal comprising information relating to the motor speed n is sent from the low-voltage inverter of the electrical machine 2 to the controller 4. In all the cases shown in FIGS. 3a to 3d, the motor speed n remains virtually constant. In a determination S2.1, an actual direction of travel of the work machine 14 is determined depending on the detected motor speed n. Because the motor speed n remains constant, the actual direction of travel and thus also an actual speed of the work machine 14 also remain constant. Therefore, a positive motor speed n in FIGS. 3a and 3c corresponds to an actual direction of travel in the forward direction of travel, and a negative motor speed n as shown in FIGS. 3b and 3d corresponds to a backward direction of travel.

It is also determined whether there is a reversing request. This determination is based on the detected desired direction of travel FRW and the detected motor speed n. In FIGS. 3a and 3b, the desired direction of travel FRW changes from forward to backward or vice versa. After the change in the desired direction of travel, the desired direction of travel FRW is different from the actual direction of travel. This can be seen in FIGS. 3a and 3b in that the motor speed n has a different sign from the desired direction of travel FRW from time point t1. In these cases, it is determined that there is a reversing request of the driver of the work machine 14. In the other cases, shown in FIGS. 3c and 3d, there is no reversing request, since the desired direction of travel is changed from forward and backward, respectively, to neutral. This can be seen because the desired direction of travel FRW is zero from time point t1.

The operating mode BM of the electrical machine 2 is also detected S3. For this, a signal comprising information relating to the operating mode BM is sent from the low-voltage inverter of the electrical machine 2 to the controller 4.

The method also comprises a step of determining S4 a safety-critical state of the electrical machine 2. In the cases shown in FIGS. 3a and 3b, a safety-critical state is determined when conditions for determining S4 the safety-critical state are present for a debouncing time T1 and additionally for an error tolerance time T2 to a time point t2. One condition is that the actual direction of travel is counter to the desired direction of travel FRW. Then a check is carried out for a second condition. The second condition can be that the operating mode BM of the electrical machine 2 remains in motor operation. In FIGS. 3a and 3b, the operating mode BM remains constant. After the debouncing time T1 and the error tolerance time T2 have elapsed, a safety-critical state is determined S4 at time point t2.

Alternatively to monitoring the operating mode BM, a check is carried out as to whether the motor speed n changes. A gradient of the motor speed n is determined S2.2, and this determined gradient is compared with a predetermined minimum gradient. If the determined gradient is smaller than the minimum gradient, there is a second case for determining S4 a safety-critical state.

In other words, the safety-critical state is determined when at least one of these two mentioned options is present, i.e., either the operating mode BM remains in motor operation, or the gradient of the motor speed n is smaller than the minimum gradient.

At the same time, the safety-critical state is determined S4 only when the detected motor speed n is outside a parameter range P around a motor speed n corresponding to a standstill of the work machine. The parameter range P is indicated by dashed lines around the time axis t. Motor speeds n inside the parameter range P correspond to travel speeds of the work machine 14 up to an absolute value of a minimum speed. This ensures that the method for stopping undesired continuation in the current direction of travel is carried out only at travel speeds greater than the minimum speed.

Figure 3C:
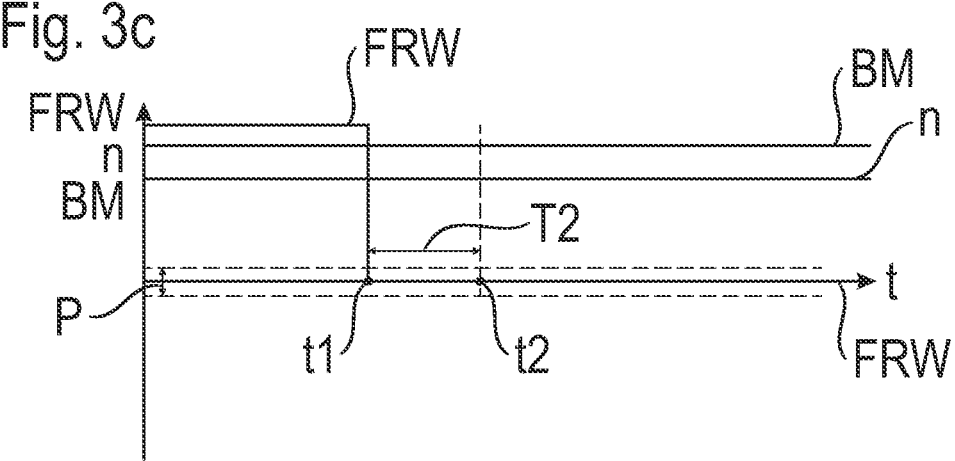
Figure 3D:
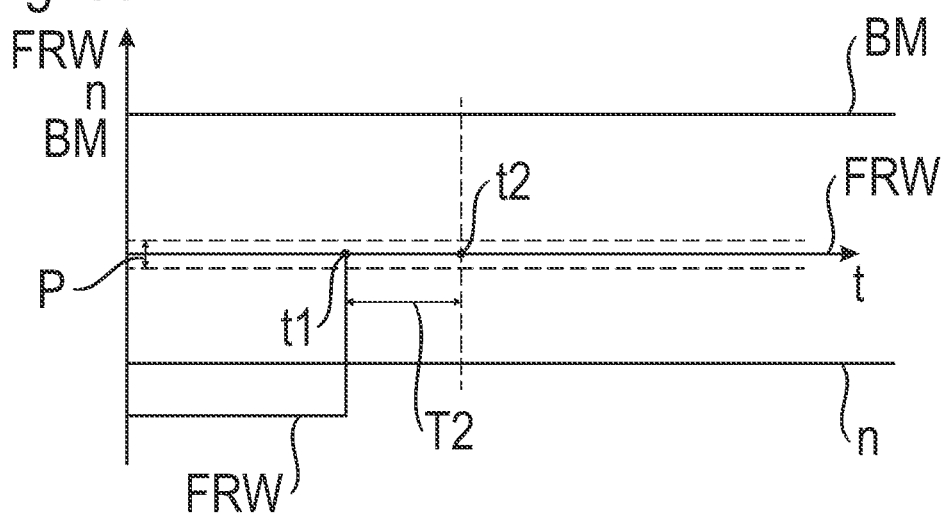

If there is no reversing request, as in the cases shown in FIGS. 3c and 3d, the debouncing time T1 is omitted. The safety-critical state is then determined S4 after the error tolerance time T2. In these cases, the error tolerance time T2 thus starts as soon as the desired direction of travel FRW and the actual direction of travel are different. After the error tolerance time T2, the safety-critical state is determined S4 at time point t2. The debouncing time T1 is not additionally allowed to elapse in these cases.

A signal is also sent S5 to the electrical machine 2, and to the low-voltage inverter, to convert the electrical machine 2 into a state not suitable for propulsion. This state not suitable for propulsion is achieved in that a safety state query is sent from the controller 4 to the inverter and also to the electrical machine 2. After the electrical machine 2 has been converted into a state not suitable for propulsion, the electrical machine 2 is torque-free with regard to the propulsion of the work machine 14. There is therefore no force transmission from the electrical machine 2 for the propulsion of the work machine 14.

If the signal for conversion into a state not suitable for propulsion is not sent S5, information relating to a setpoint torque is sent from the controller 4 to the electrical machine 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

2 Electrical machine
4 Controller
6 Drive group
8 Vehicle controller
12 Direction of travel switch
14 Work machine
S1 (Step) detecting a desired direction of travel
S2 (Step) detecting a state variable of the work machine
S2.1 (Step) determining an actual direction of travel
S2.2 (Step) determining a gradient of the motor speed
S3 (Step) detecting information relating to an operating mode of the electrical machine
S4 (Step) determining a safety-critical state
S5 (Step) sending a signal to the electrical machine
BM Operating mode
FRW Desired direction of travel
n Motor speed
P Parameter range
T1 Debouncing time
T2 Error tolerance time
t Time
t1 (Time point) desired direction of travel changes
t2 (Time point) critical state present

The invention claimed is:

1. A method for stopping undesired continuation in a current direction of travel of a work machine, wherein the work machine has an electrical machine for propulsion of the work machine, the method comprising:
   detecting a desired direction of travel of a driver of the work machine;
   detecting a state variable of the work machine that correlates with an actual direction of travel of the work machine;
   determining, on the basis of the detected desired direction of travel and the detected state variable, whether the electrical machine is in a safety-critical state, wherein the safety critical state is determined when the safety-critical state is present for a duration of an error tolerance time; and
   if it has been determined that the electrical machine is in the safety-critical state, sending a signal to the electrical machine to convert the electrical machine into a state not suitable for propulsion.

2. The method as claimed in claim 1, wherein detecting the state variable correlating with the actual direction of travel comprises:
   detecting a motor rotation direction of the electrical machine; and
   determining the actual direction of travel on the basis of the detected motor rotation direction,
   wherein the safety-critical state is determined when the determined actual direction of travel is different from the detected desired direction of travel.

3. The method as claimed in claim 1, wherein detecting the state variable correlating with the actual direction of travel comprises detecting a motor speed of the electrical machine, and wherein the safety-critical state is determined when the detected motor speed is outside a parameter range around a motor speed corresponding to a standstill of the work machine.

4. The method as claimed in claim 3, comprising:
determining a gradient of the motor speed on the basis of the detected motor speed; and
determining the safety-critical state when the determined gradient of the motor speed is smaller than a minimum gradient.

5. The method as claimed in claim 1, comprising:
detecting information relating to an operating mode of the electrical machine; and
determining the safety-critical state when the electrical machine is in motor operation.

6. The method as claimed in claim 1, comprising:
determining a reversing request on the basis of the detected desired direction of travel and the detected state variable; and
if it has been determined that a reversing request is present, determining the safety-critical state when the safety-critical state is present for a debouncing time.

7. A controller configured to carry out the method for controlling a work machine as claimed in claim 1.

8. A drive group having an electrical machine and the controller as claimed in claim 7.

9. A work machine having a vehicle controller, a direction of travel switch, and the drive group as claimed in claim 8.

* * * * *